US009559591B2

(12) United States Patent
Hang et al.

(10) Patent No.: US 9,559,591 B2
(45) Date of Patent: Jan. 31, 2017

(54) MULTI-PHASE INTERLEAVED CONVERTER WITH AUTOMATIC CURRENT-SHARING FUNCTION AND CONTROL METHOD THEREFOR

(71) Applicant: Silergy Semiconductor Technology (Hangzhou) LTD, Hangzhou, ZheJiang Province (CN)

(72) Inventors: Kailang Hang, Hangzhou (CN); Liangwei Sun, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/939,037

(22) Filed: Nov. 12, 2015

(65) Prior Publication Data

US 2016/0164414 A1    Jun. 9, 2016

(30) Foreign Application Priority Data

Dec. 9, 2014    (CN) .......................... 2014 1 0746860

(51) Int. Cl.
*H02M 3/158*    (2006.01)
*H02M 3/157*    (2006.01)
*H02M 1/00*    (2006.01)

(52) U.S. Cl.
CPC ... *H02M 3/1584* (2013.01); *H02M 2001/0025* (2013.01); *H02M 2003/1586* (2013.01)

(58) Field of Classification Search
CPC .... H02M 3/156; H02M 3/157; H02M 3/1584; H02M 2003/1586; H02M 3/1588
See application file for complete search history.

(56) References Cited

U.S. PATENT DOCUMENTS

| 6,137,274 | A  | * | 10/2000 | Rajagopalan | ........... H02J 1/102 323/272 |
| 6,285,571 | B1 |   | 9/2001  | Brooks et al. | |
| 6,346,798 | B1 |   | 2/2002  | Passoni et al. | |
| 7,109,691 | B2 |   | 9/2006  | Brooks et al. | |
| 7,479,772 | B2 | * | 1/2009  | Zane | ........................ H02J 1/102 323/272 |
| 8,525,497 | B2 | * | 9/2013  | Chiu | ........................ G05F 1/618 323/272 |
| 2009/0091304 | A1 |   | 4/2009  | Yang | |
| 2015/0077072 | A1 | * | 3/2015  | Yu | ......................... H02M 3/158 323/271 |

* cited by examiner

*Primary Examiner* — Gary L Laxton

(74) *Attorney, Agent, or Firm* — Michael C. Stephens, Jr.

(57) ABSTRACT

A multi-phase interleaved converter can include: (i) a plurality of phases, where each phase of the multi-phase interleaved converter includes a buck-type power stage having a power switch, a freewheeling switch and an inductor, a switching control circuit and a reference signal generator, and where each switching control circuit includes: (ii) an adder that receives a ramp signal and a feedback signal that represents an output voltage, and generates a feedback voltage signal; (iii) a comparator that receives the feedback voltage signal and a reference voltage signal, and generates a comparator output signal; and (iv) a logic circuit that receives the comparator output signal and an output from an on time control circuit, and controls a switching operation of the power switch.

12 Claims, 4 Drawing Sheets

MULTI-PHASE INTERLEAVED CONVERTER WITH AUTOMATIC CURRENT-SHARING FUNCTION AND CONTROL METHOD THEREFOR

RELATED APPLICATIONS

This application claims the benefit of Chinese Patent Application No. 201410746860.X, filed on Dec. 9, 2014, which is incorporated herein by reference in its entirety.

FIELD OF THE INVENTION

The present disclosure generally relates to the field of switching power supplies, and more particularly to a multi-phase interleaved converter with automatic current-sharing functionality.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a multi-phase interleaved converter can include: (i) a plurality of phases, where each phase of the multi-phase interleaved converter includes a buck-type power stage having a power switch, a freewheeling switch and an inductor, a switching control circuit and a reference signal generator, and where each switching control circuit includes an adder, a comparator, an on time control circuit, and a logic circuit; (ii) the adder being configured to receive a ramp signal and a feedback signal that represents an output voltage of the multi-phase interleaved converter, and to generate a feedback voltage signal; (iii) the comparator being configured to receive the feedback voltage signal and a reference voltage signal, and to generate a comparator output signal; (iv) the logic circuit being configured to receive the comparator output signal and an output from the on time control circuit, and to control a switching operation of the power switch; and (v) the reference signal generator being configured to provide the reference voltage signal of each phase according to an inductor current sense signal of each phase, such that current-sharing occurs between each of the plurality of phases.

In one embodiment, a method of controlling a multi-phase interleaved converter, can include: (i) providing a plurality of phases, where each phase of the multi-phase interleaved converter includes a buck-type power stage having a power switch, a freewheeling switch and an inductor, a switching control circuit and a reference signal generator, and where each switching control circuit includes an adder, a comparator, an on time control circuit, and a logic circuit; (ii) receiving, by the adder, a ramp signal and a feedback signal that represents an output voltage of the multi-phase interleaved converter, and generating a feedback voltage signal; (iii) receiving, by the comparator, the feedback voltage signal and a reference voltage signal, and generating a comparator output signal; (iv) receiving, by the logic circuit, the comparator output signal and an output from the on time control circuit, and controlling a switching operation of the power switch; and (v) providing, by the reference signal generator, the reference voltage signal of each phase according to an inductor current sense signal of each phase, such that current-sharing occurs between each of the plurality of phases.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
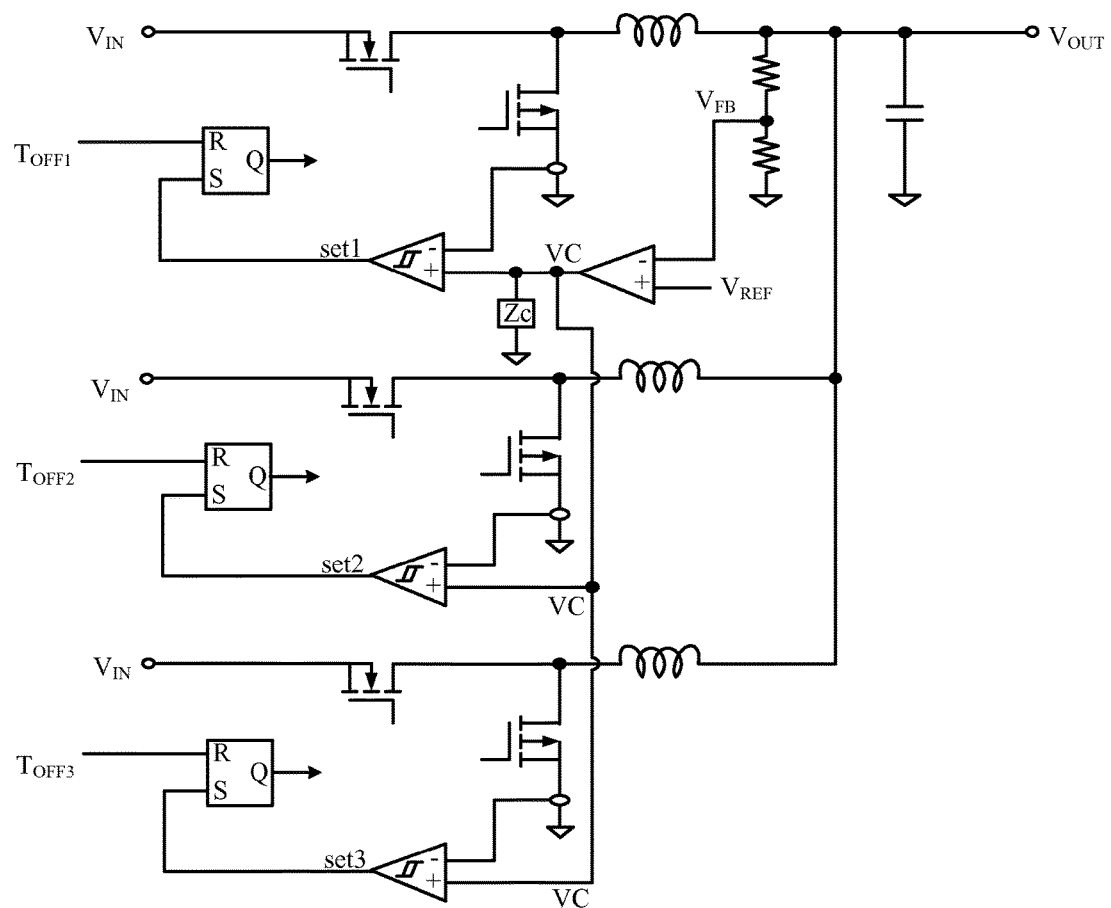
FIG. 1 is a schematic block diagram of an example multi-phase interleaved buck converter.

Referring now to FIG. 1, shown is a schematic block diagram of an example multi-phase interleaved buck converter. Interleaved multi-phase can be applied in a switching power supply in order to reduce the size of an output filter inductor of a step-down converter. In a multi-phase interleaved converter, each phase of the converter can include a power switch, a filter inductor corresponding to each power switch, and an output terminal coupled to an output filter capacitor. With such a multi-phase interleaved structure, the current that should be provided by a single-phase converter can instead be provided by a multi-phase converter, so the current provided by each phase can be significantly reduced. In this approach, the output current of each phase should be made equal to each other by controlling all phases in balance, and the power switch of each phase should be turned on with a certain phase difference between each other in order to reduce the voltage ripple at the output terminal.

In the example of FIG. 1, compensation signal VC can initially be generated by comparing feedback signal $V_{FB}$ that represents an output of the converter against reference voltage $V_{REF}$, and then compensating the error therebetween. Compensation signal VC can be used to compare against a sense current flowing through a freewheeling switch in each phase in order to generate a turn on signal. Also, a constant on time control circuit can generate a turn off signal. Therefore, the output current of each phase may be equal to each other with a same valley current. Because the frequency of such a constant on time control method may not be fixed, the phase difference may not be automatically obtained. Thus, a phase-locked loop (PLL) may be used to obtain the phase difference.

Also in the example of FIG. 1, current-sharing can be realized by comparing against compensation signal VC in a multi-phase interleaved converter. However, the dynamic response may be relatively slow due to limitations of the current loop. Also, current may not be precisely shared between all phases because a sampling error can occur in the valley current and the offset voltage in each comparator.

In one embodiment, a multi-phase interleaved converter can include: (i) a plurality of phases, where each phase of the multi-phase interleaved converter includes a buck-type power stage having a power switch, a freewheeling switch and an inductor, a switching control circuit and a reference signal generator, and where each switching control circuit includes an adder, a comparator, an on time control circuit, and a logic circuit; (ii) the adder being configured to receive a ramp signal and a feedback signal that represents an output voltage of the multi-phase interleaved converter, and to generate a feedback voltage signal; (iii) the comparator being configured to receive the feedback voltage signal and a reference voltage signal, and to generate a comparator output signal; (iv) the logic circuit being configured to receive the comparator output signal and an output from the on time control circuit, and to control a switching operation of the power switch; and (v) the reference signal generator being configured to provide the reference voltage signal of each phase according to an inductor current sense signal of each phase, such that current-sharing occurs between each of the plurality of phases.

Figure 2:
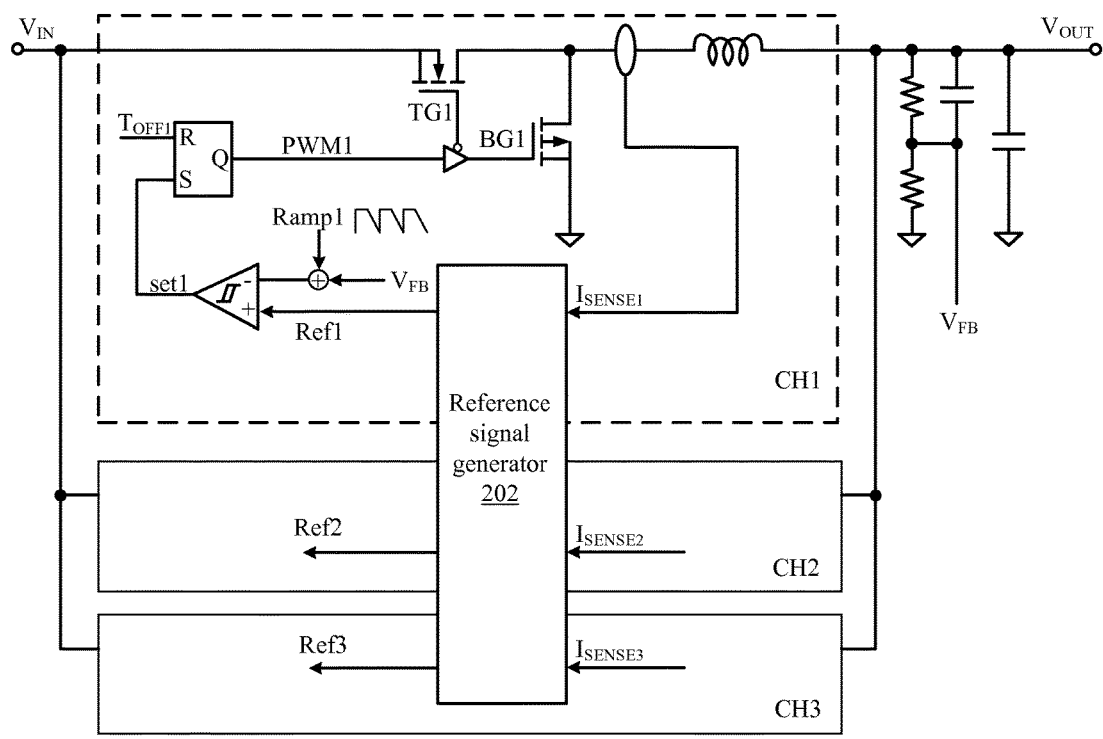
FIG. 2 is a schematic block diagram of an example multi-phase interleaved converter with automatic current-sharing functionality, in accordance with embodiments of the present invention.
Figure 3:
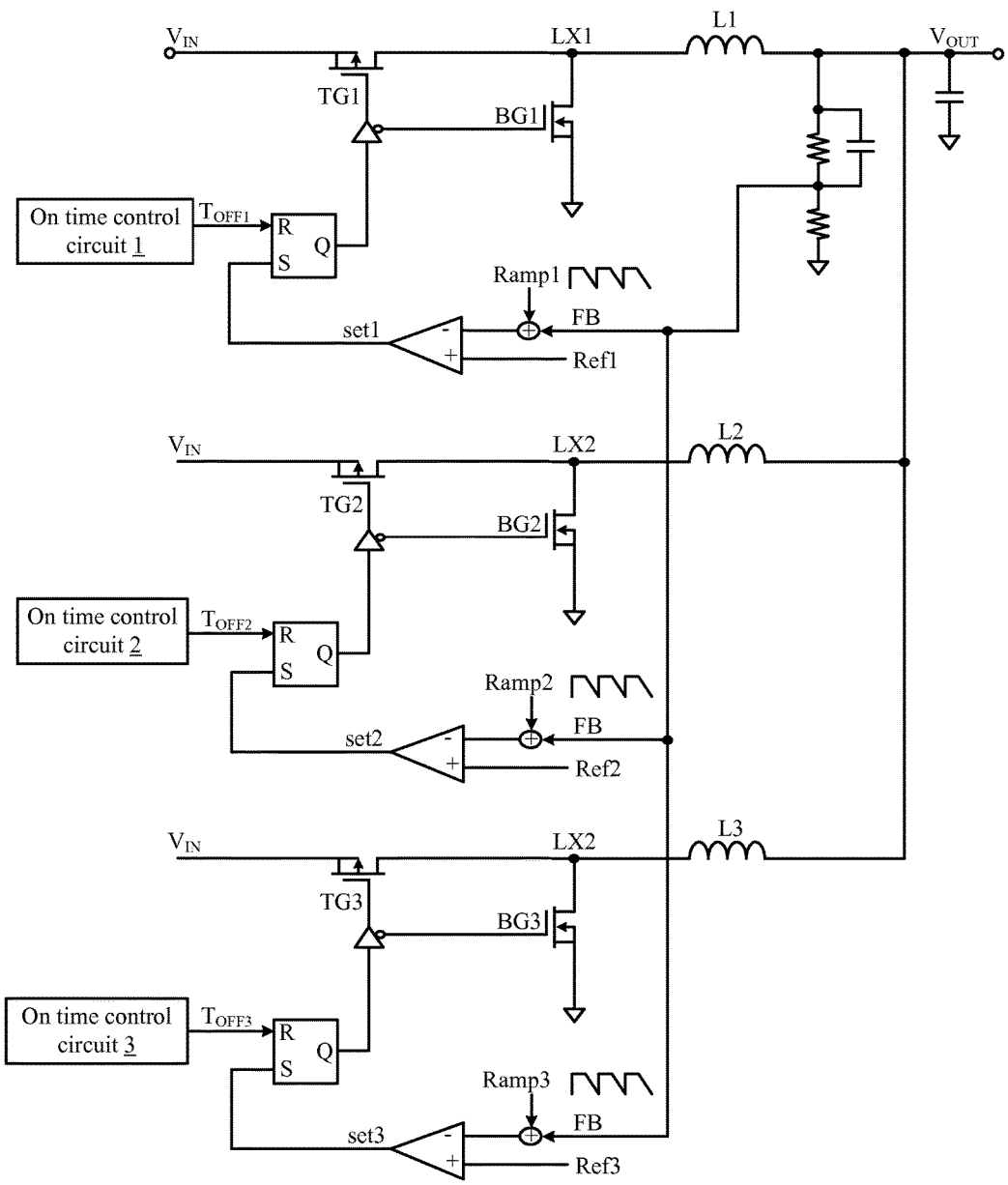
FIG. 3 is a schematic block diagram of an example multi-phase interleaved converter with automatic current-sharing functionality, in accordance with embodiments of the present invention.

Referring now to FIGS. 2 and 3, shown are schematic block diagrams of an example multi-phase interleaved converter with automatic current-sharing functionality, in accordance with embodiments of the present invention. In this particular example, a three-phase interleaved buck converter is shown, those skilled in the art will recognize that other structures and number of phases of the multi-phase interleaved converter can also be utilised in certain embodiments. In this example, the first phase buck converter may be set as a main channel, and the second and third phase buck converters may be set as slave channels with the same circuit structure as the first phase circuitry. The circuit structure of the first phase can include a buck topology with power switch TG1, freewheeling switch BG1, and inductor L1. The first phase circuit structure can also include a switching control circuit with an adder, an on time control circuit, a comparator (e.g., a hysteretic comparator), and a logic circuit (e.g., an RS flip-flop).

The adder can receive feedback signal FB that represents an output voltage of the first phase and ramp signal Ramp1, and may generate a first feedback voltage signal. The comparator of the first phase may have an inverting input terminal that receives the first feedback voltage signal, and a non-inverting input terminal that receives reference voltage signal Ref1. When the first feedback voltage signal is less than reference voltage signal Ref1, the comparator may activate (e.g., bring high) output signal set1, and the corresponding RS flip-flop can activate a switching control signal to turn on power switch TG1. Here, the switching control signal can turn on power switch TG1 through a driver, and on time control circuit 1 can activate off signal $T_{OFF1}$ to reset the corresponding RS flip-flop after power switch TG1 is turned on for a predetermined time. In response, the RS flip-flop then can deactivate the switching control signal to turn off power switch TG1, and freewheeling switch BG1 can simultaneously be turned on.

The next switching cycle can begin when the output signal of the comparator again goes active high, and the operation may be repeated. In addition, the ramp signal shown in FIGS. 2 and FIG. 3 may be generated by any suitable ramp signal generator. Also, the on time control circuit may be any suitable timing circuit that starts timing when power switch TG1 is turned on, and until the elapsed time reaches a predetermined value, and an off clock signal may be activated. While the on time control circuit described in this particular example is not a fixed-frequency control, particular embodiments may also support a fixed-frequency type of control.

In this way, a feedback loop of the first phase can improve the response speed by controlling the ripple of the output voltage. Further, the feedback loops of the remaining two phases may have substantially the same circuit structure and control as the first phase, and may also receive feedback signal FB. Also, the same ramp signal can be applied to the different adders in some cases. However, the comparators in the three phases can receive different reference voltage signals from reference signal generator 202.

Figure 4:
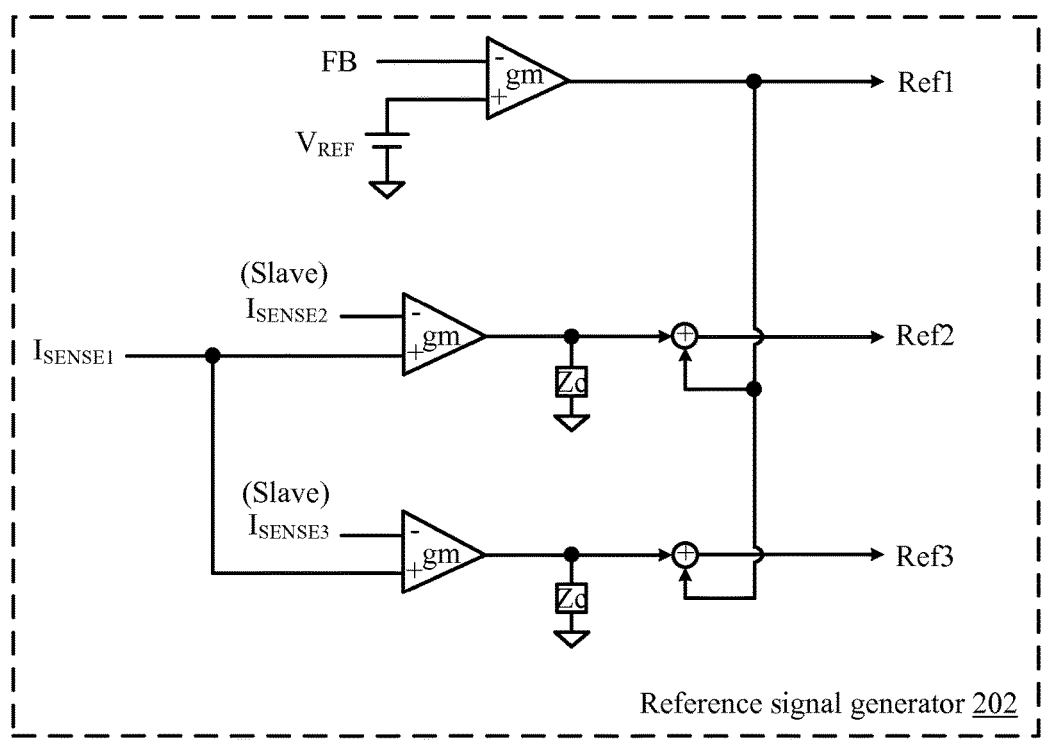
FIG. 4 is schematic block diagram of an example reference signal generating circuit, in accordance with embodiments of the present invention.

Referring now to FIG. 4, shown is schematic block diagram of an example reference signal generating circuit, in accordance with embodiments of the present invention. In this example, reference signal generator 202 can include a main channel reference signal generator and a slave channel reference signal generator. The main channel reference signal generator can include a main channel transconductance amplifier having an inverting input terminal that receives feedback signal FB, a non-inverting input terminal that receives reference voltage signal $V_{REF}$, and an output terminal that provides a main channel transconductance signal. In addition, the main channel transconductance signal can be compensated by a compensation circuit in order to generate reference signal Ref1.

In this particular example, the slave channel reference signal generator can include second and third slave channel reference signal generators. The second slave channel reference signal generator can include a second slave channel transconductance amplifier and a second slave channel adder. For example, the second slave channel transconductance amplifier may have an inverting input terminal that receives inductor current sense signal $I_{SENSE2}$ of the second phase, a non-inverting input terminal that receives inductor current sense signal $I_{SENSE1}$ of the first phase, and an output terminal that outputs a second slave channel transconductance signal. The second slave channel transconductance signal can be added with reference signal Ref1 by the second slave channel adder, after being compensated by a compensation circuit, in order to generate reference signal Ref2.

The third slave reference generator can include a third slave transconductance amplifier having an inverting input terminal that receives inductor current sense signal $I_{SENSE3}$ of the third phase, a non-inverting input terminal that receives inductor current sense signal $I_{SENSE1}$ of the first phase, and an output terminal that outputs a third slave channel transconductance signal. Also, the third slave channel transconductance signal can be added with reference signal Ref1 by the third slave channel adder, after being compensated by a compensation circuit, in order to generate slave signal Ref3.

As described above, the first phase can be designated as the main channel. Thus, reference signal Ref1 may not be generated according to any inductor current sense signal, while reference signal Ref2 can be generated according to inductor current sense signals $I_{SENSE1}$ and $I_{SENSE2}$. For example, when inductor current sense signal $I_{SENSE2}$ is greater than inductor current sense signal $I_{SENSE1}$, reference signal Ref2 may decrease, such that the output current of the second phase may accordingly decrease until inductor current sense signal $I_{SENSE2}$ is equal to inductor current sense signal $I_{SENSE1}$. Then, the output current of the second phase may consistent with (e.g., equal to) the output current of the first phase as in a stable state.

Similarly, reference signal Ref3 can be generated according to inductor current sense signals $I_{SENSE1}$ and $I_{SENSE3}$, and the output current of the third phase may be consistent with (e.g., equal to) the output current of the first phase in the stable state. Reference signal generator 202 can achieve automatic current-sharing, along with meeting other interleaved converter requirements. In this way, a multi-phase buck converter as described herein can improve the circuit response speed by controlling the ripple of the output voltage, and also maintain the output current of each phase consistent with each other in order to achieve high precision with automatic current-sharing.

In order to reduce the ripple of the output voltage of each phase of the multi-phase interleaved buck converter, interleaved control may be employed. In one interleaved control approach, an on time control circuit can be utilized to realize interleaved control through a PLL. For example, the PLL circuit can receive a clock signal, and may output an off signal. The off signal can ensure that the on time of a power switch in each phase is substantially constant, where the phase difference between the clock signals of the three phases is a predetermined phase. In another interleaved control approach, an on time control circuit can be utilized to directly receive interleaved clock signals. For example, the on time control circuit can receive a clock signal as the off signal, and the phase difference between the clock signals of three phases can be a predetermined phase.

In one embodiment, a method of controlling a multi-phase interleaved converter, can include: (i) providing a plurality of phases, where each phase of the multi-phase interleaved converter includes a buck-type power stage having a power switch, a freewheeling switch and an inductor, a switching control circuit and a reference signal generator, and where each switching control circuit includes an adder, a comparator, an on time control circuit, and a logic circuit; (ii) receiving, by the adder, a ramp signal and a feedback signal that represents an output voltage of the multi-phase interleaved converter, and generating a feedback voltage signal; (iii) receiving, by the comparator, the feedback voltage signal and a reference voltage signal, and generating a comparator output signal; (iv) receiving, by the logic circuit, the comparator output signal and an output from the on time control circuit, and controlling a switching operation of the power switch; and (v) providing, by the reference signal generator, the reference voltage signal of each phase according to an inductor current sense signal of each phase, such that current-sharing occurs between each of the plurality of phases.

In particular embodiments, a control method for a multi-phase interleaved converter, can be configured for each phase of the multi-phase interleaved converter having a buck topology including power switch, a freewheeling switch, and an inductor. The example control method can include adding a ramp signal (e.g., Ramp1, Ramp2, Ramp3, etc.) and a feedback signal (e.g., FB) that represents an output voltage (e.g., $V_{OUT}$) of the multi-phase interleaved converter, to generate a feedback voltage signal. The feedback voltage signal can be compared against a reference signal (e.g., Ref1, Ref2, Ref3, etc.) of each phase, to provide a comparator output signal (e.g., set1, set2, set3, etc.). An off signal (e.g., $T_{OFF1}$, $T_{OFF2}$, $T_{OFF3}$, etc.) and a comparator output signal can be used to control the switching operation of the corresponding power switch (e.g., TG1, TG2, TG3, etc.).

For example, the reference signal of each phase can be generated by a reference signal generator (e.g., 202) according to an inductor current sense signal (e.g., $I_{SENSE1}$, $I_{SENSE2}$, $I_{SENSE3}$, etc.) of each phase, so as to achieve current-sharing between all phases. For example, the reference signal of each phase can be generated by generating a first reference voltage signal (e.g., Ref1) by a main channel reference signal generator. The main channel reference signal generator can include a main channel transconductance amplifier that receives the feedback signal (e.g., FB) and a reference signal (e.g., $V_{REF}$), and can generate a main channel transconductance signal as the first reference voltage signal via a compensation circuit.

The remaining reference voltage signals can be generated by slave channel reference signal generators. Each slave channel reference signal generator can include a slave channel transconductance amplifier and a slave channel adder. For example, the slave channel transconductance amplifier may receive inductor current sense signal $I_{SENSE1}$ at a noninverting input terminal, and an inductor current sense signal of a corresponding phase other than the first phase (e.g., $I_{SENSE2}$, $I_{SENSE3}$, etc.) at an inverting terminal, and may have an output terminal for generating a corresponding slave channel transconductance signal. Also, the slave channel transconductance signal can be added with reference voltage signal Ref1 after being compensated via a compensation circuit, in order to generate a corresponding reference voltage signal (e.g., Ref2, Ref3).

In this way, a multi-phase interleaved converter with automatic current-sharing functionality, and an associated control method may improve the response speed of the feedback loop by adding a ramp signal to the feedback signal. Also, the reference voltage signal of each phase can be regulated by a reference signal generator, so as to maintain the output current of each slave channel to be consistent with the output current of the main channel, for automatic current-sharing.

The embodiments were chosen and described in order to best explain the principles of the invention and its practical applications, to thereby enable others skilled in the art to best utilise the invention and various embodiments with modifications as are suited to particular use(s) contemplated. It is intended that the scope of the invention be defined by the claims appended hereto and their equivalents.

What is claimed is:
1. A multi-phase interleaved converter, comprising:
   a) a plurality of phases, wherein each phase of said multi-phase interleaved converter comprises a buck-type power stage having a power switch, a freewheeling switch and an inductor, a switching control circuit and a reference signal generator, and wherein each switching control circuit comprises an adder, a comparator, an on time control circuit, and a logic circuit;

b) said adder being configured to receive a ramp signal and a feedback signal that represents an output voltage of said multi-phase interleaved converter, and to generate a feedback voltage signal;

c) said comparator being configured to receive said feedback voltage signal and a reference voltage signal, and to generate a comparator output signal;

d) said logic circuit being configured to receive said comparator output signal and an output from said on time control circuit, and to control a switching operation of said power switch; and e) said reference signal generator being configured to provide said reference voltage signal of each phase according to an inductor current sense signal of each phase, such that current-sharing occurs between each of said plurality of phases.

2. The multi-phase interleaved converter of claim 1, wherein said reference signal generator comprises:

a) a main channel reference signal generator configured to generate a first reference voltage signal; and b) a plurality slave channel reference signal generators configured to generate remaining reference voltage signals using said first reference voltage signal.

3. The multi-phase interleaved converter of claim 2, wherein:

a) said main channel reference signal generator comprises a main channel transconductance amplifier configured to receive said feedback signal and a reference signal, and to generate a main channel transconductance signal as said first reference voltage signal via a compensation circuit; and b) each slave channel reference signal generator comprises a slave channel transconductance amplifier and a slave channel adder, said slave channel transconductance amplifier being configured to receive an inductor current sense signal of a first phase, and an inductor current of a phase other than said first phase, and to generate a corresponding slave channel transconductance signal, wherein said slave channel adder is configured to add said slave channel transconductance signal with said first reference voltage signal after being compensated via a compensation circuit to generate a corresponding reference voltage signal.

4. The multi-phase interleaved converter of claim 1, wherein:

a) said logic circuit is configured to receive said comparator output signal, and to activate a switching control signal to turn on said power switch; and b) said on time control circuit is configured to begin timing when said power switch is turned on, and to activate an off signal after a predetermined time has elapsed, wherein said logic circuit deactivates said switching control signal in response to said off signal being activated in order to turn off said power switch.

5. The multi-phase interleaved converter of claim 4, wherein said on time control circuit comprises a phase-locked loop configured to receive a clock signal, and to generate said off signal.

6. The multi-phase interleaved converter of claim 5, wherein a phase difference between two clock signals is predetermined.

7. A method of controlling a multi-phase interleaved converter, the method comprising:

a) providing a plurality of phases, wherein each phase of said multi-phase interleaved converter comprises a buck-type power stage having a power switch, a free-wheeling switch and an inductor, a switching control circuit and a reference signal generator, and wherein each switching control circuit comprises an adder, a comparator, an on time control circuit, and a logic circuit;

b) receiving, by said adder, a ramp signal and a feedback signal that represents an output voltage of said multi-phase interleaved converter, and generating a feedback voltage signal;

c) receiving, by said comparator, said feedback voltage signal and a reference voltage signal, and generating a comparator output signal;

d) receiving, by said logic circuit, said comparator output signal and an output from said on time control circuit, and controlling a switching operation of said power switch; and e) providing, by said reference signal generator, said reference voltage signal of each phase according to an inductor current sense signal of each phase, such that current-sharing occurs between each of said plurality of phases.

8. The method of claim 7, wherein said providing said reference voltage signal of each phase comprises:

a) generating, by a main channel reference signal generator, a first reference voltage signal; and b) generating, by a plurality slave channel reference signal generators, remaining reference voltage signals using said first reference voltage signal.

9. The method of claim 8, further comprising:

a) receiving, by a main channel transconductance amplifier in said main channel reference signal generator, said feedback signal and a reference signal, and generating a main channel transconductance signal as said first reference voltage signal via a compensation circuit;

b) receiving, by a slave channel transconductance amplifier in each slave channel reference signal generator, an inductor current sense signal of a first phase, and an inductor current of a phase other than said first phase, and generating a corresponding slave channel transconductance signal; and c) adding, by a slave channel adder in each slave channel reference signal generator, said slave channel transconductance signal with said first reference voltage signal, after being compensated via a compensation circuit, for generating a corresponding reference voltage signal.

10. The method of claim 7, further comprising:

a) receiving, by said logic circuit, said comparator output signal, and activating a switching control signal to turn on said power switch;

b) beginning timing, by said on time control circuit, when said power switch is turned on, and activating an off signal after a predetermined time has elapsed; and c) deactivating, by said logic circuit, said switching control signal in response to said off signal being activated in order to turn off said power switch.

11. The method of claim 10, wherein said on time control circuit comprises a phase-locked loop for receiving a clock signal, and generating said off signal.

12. The method of claim 11, further comprising predetermining a phase difference between two clock signals.

* * * * *